US00RE48512E

(19) United States
(12) Reissued Patent
Stirbis

(10) Patent Number: US RE48,512 E
(45) Date of Reissued Patent: Apr. 13, 2021

(54) PORTABLE DRINKING DEVICE

(71) Applicant: CHUG BUD, LLC, Ottawa, IL (US)

(72) Inventor: Chayancze A. Stirbis, Ottawa, IL (US)

(73) Assignee: CHUG BUD, LLC, Los Angeles, CA (US)

(21) Appl. No.: 16/661,965

(22) Filed: Oct. 23, 2019

Related U.S. Patent Documents

Reissue of:
(64) Patent No.: 10,278,526
Issued: May 7, 2019
Appl. No.: 16/108,469
Filed: Aug. 22, 2018

U.S. Applications:
(63) Continuation of application No. 15/695,554, filed on Sep. 5, 2017, now Pat. No. 10,058,203.

(51) Int. Cl.
*A47G 21/18* (2006.01)
*B67B 7/00* (2006.01)
*A47G 19/22* (2006.01)

(52) U.S. Cl.
CPC ..... *A47G 21/18* (2013.01); *A47G 19/22* (2013.01); *B67B 7/24* (2013.01); *B67B 7/26* (2013.01)

(58) Field of Classification Search
CPC ..... A47G 21/18; A47G 19/22; A67B 7/24; A67B 7/26
See application file for complete search history.

(56) References Cited

U.S. PATENT DOCUMENTS 5,964,382 A * 10/1999 Randal ..... B65D 51/1611 222/478
8,387,264 B1 * 3/2013 Pritchard ..... B26F 1/32 30/366
2005/0269336 A1 * 12/2005 Rockhill ..... A47G 19/2272 220/705
2006/0086744 A1 * 4/2006 Li ..... A47G 21/18 220/709
2009/0230141 A1 * 9/2009 Haney ..... B65D 25/48 220/745
2012/0325835 A1 * 12/2012 Merino ..... A47G 19/2211 220/705
2013/0092699 A1 * 4/2013 Li ..... B65D 47/068 220/709
2013/0221004 A1 * 8/2013 Rosen ..... A47G 21/18 220/212
2014/0069065 A1 * 3/2014 Laverty ..... B67B 7/24 53/492
2014/0083520 A1 * 3/2014 Mullen ..... A24F 1/30 137/154
2019/0218087 A1 * 7/2019 Clark ..... A47G 21/18

* cited by examiner

*Primary Examiner* — Cary E Wehner
(74) *Attorney, Agent, or Firm* — Hackler Daghighian Martino & Novak

(57) ABSTRACT

A portable drinking device capable of fitting over a typical pressurized beverage can to direct the flow of fluid from the can to a recipient's mouth. The portable drinking device may be positioned over the open top of the can and the can and portable drinking device are slightly tilted sideways. After the can has been punctured on its side, the entire assembly is positioned so that the portable drinking device directs a rapid and steady stream of fluid from the punctured can through the tube of the portable drinking device into a recipient's mouth.

19 Claims, 8 Drawing Sheets

PORTABLE DRINKING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a continuation of U.S. application Ser. No. 15/695,554 filed on Sep. 5, 2017 which is incorporated herein by reference in its entirety.

FEDERALLY SPONSORED RESEARCH OR DEVELOPMENT

Not Applicable.

BACKGROUND THE INVENTION

The present invention relates generally to a portable drinking device that allows a user to quickly consume a beverage which is usually contained in a pressurized can and the method for using the same.

"Shotgunning" is a well-known method of quickly consuming a beverage from a pressurized can by punching a hole in the side of the can. In that method, the pressurized can is usually held in a horizontal direction and tilted slightly. A small hole is punched in the side of the can close to the bottom ideally puncturing the can in the air pocket which results from the slight tilt of the can. The hole can be made with any sharp object such as a key, bottle opener, pen, knife, or the like. After the hole is punched, the user then places his or her mouth over the hole while rotating the can to an upright position. The user then pulls the tab on the can and the pressurized liquid quickly drains through the hole into the user's mouth.

U.S. Patent Pub. No. 2009/0120968 A1 discloses a device having multiple purposes, including serving as a fast pour beverage tap. That tubular device contains a piercing end at one end and a mouthpiece on the other. The piercing end is designed to puncture a pressurized can or bottle and remain in the can or bottle. After puncturing, the mouthpiece end is inserted into a user's mouth and the tab on the can is pulled causing a high speed gravity release of liquid. The tubular device may also be used as a smoking apparatus.

U.S. Pat. No. 7,784,361 discloses a more sophisticated device described as an electronic fluid dispensing apparatus having a tube with a funnel connected at one end and a differential pressure sensor at the other. An additional tube is attached to the first tube in the vicinity of the sensor. When a fluid is poured into the funnel, it passes through the tube and, by way of the sensor, the flow of fluid through the additional tube is controlled.

Consumption of beverages by such methods and using such devices has been prevalent primarily among college students and young adults as an alternative method of consuming beverages quickly and, in several instances, as part of a drinking game. Traditional shotgunning methods and known devices usually result in the aeration of the beverage causing more foam and bubbles than is desired. In addition, a certain amount of spillage still occurs after the tab on the can is pulled because the pressure at which the fluid flows out of the can through the location of the puncture is very rapid.

The present invention provides a simple and portable drinking device which addresses the problems associated with known methods and devices and reduces the amount of aeration and spillage which occurs with known devices.

SUMMARY OF THE INVENTION

The present invention provides a simple and portable drinking device that is capable of fitting over a typical pressurized beverage can to direct the flow of fluid from the can to a recipient's mouth. Once the pressurized can is opened, the portable drinking device may be positioned over the open top of the can and the entire assembly may be slightly tilted sideways. After the can is punctured on its side, the entire assembly may be positioned so that the portable drinking device directs a rapid and steady stream of fluid from the punctured can through the tube of the portable drinking device into a recipient's mouth. This portable drinking device allows a known quantity of fluid to flow freely while eliminating a substantial amount of aeration and the foam by-product often associated with prior devices.

DETAILED DESCRIPTION OF THE PREFERRED EMBODIMENT

Figure 1:
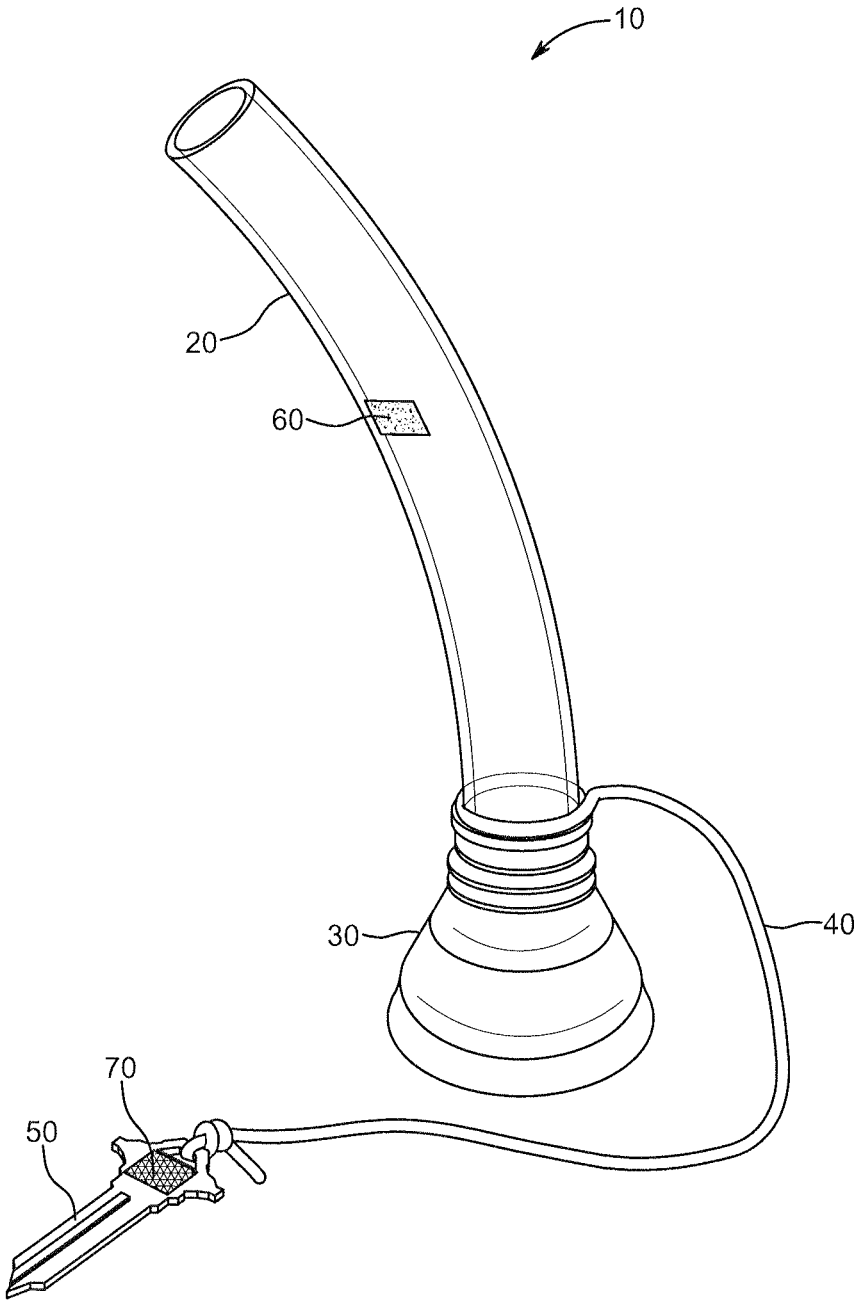
FIG. 1 is a side view of the portable drinking device of the present invention.
Figure 4:
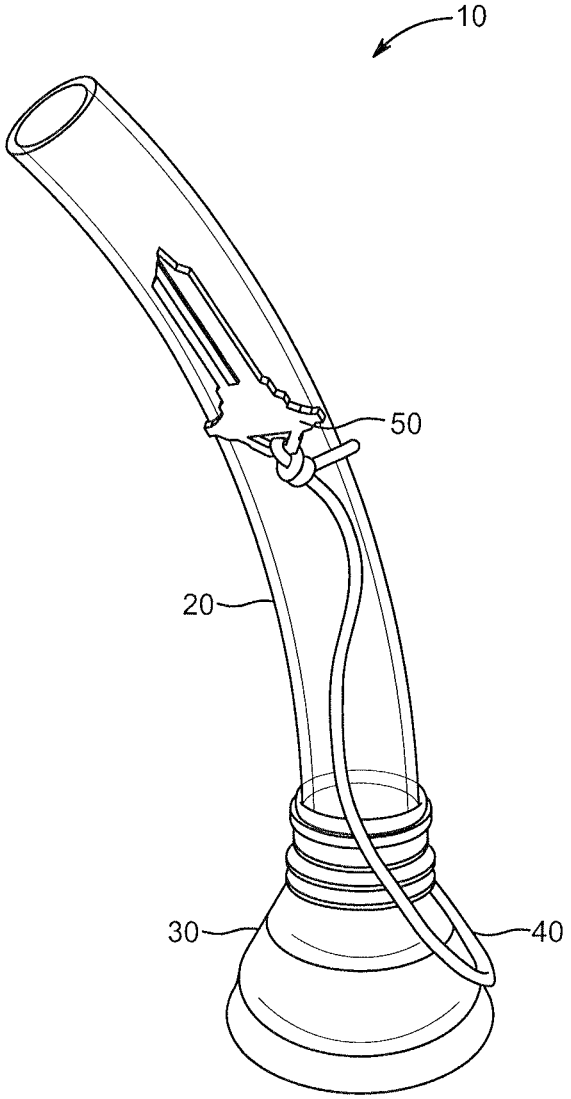
FIG. 4 is a side view of the portable drinking device of the present invention with the piercing element removably attached thereon.

The portable drinking device of the present invention is depicted in FIG. 1. The portable drinking device 10 includes a tube 20 which has affixed at one end a rounded funnel-like cap 30. Also affixed to tube 20 may be an elongated string, shoestring or elastic, plastic or ropelike material 40 to which a piercing element 50, shown as a key, but which could be a bottle opener, pen, knife or other like object, may be attached. The tube 20 and the piercing element 50 may also be provided with patches of material 60 and 70, usually made from a complimentary hook and fastener material like VELCRO®, for temporarily affixing the piercing element 50 to the tube 20 as shown in FIG. 4.

Figure 2:
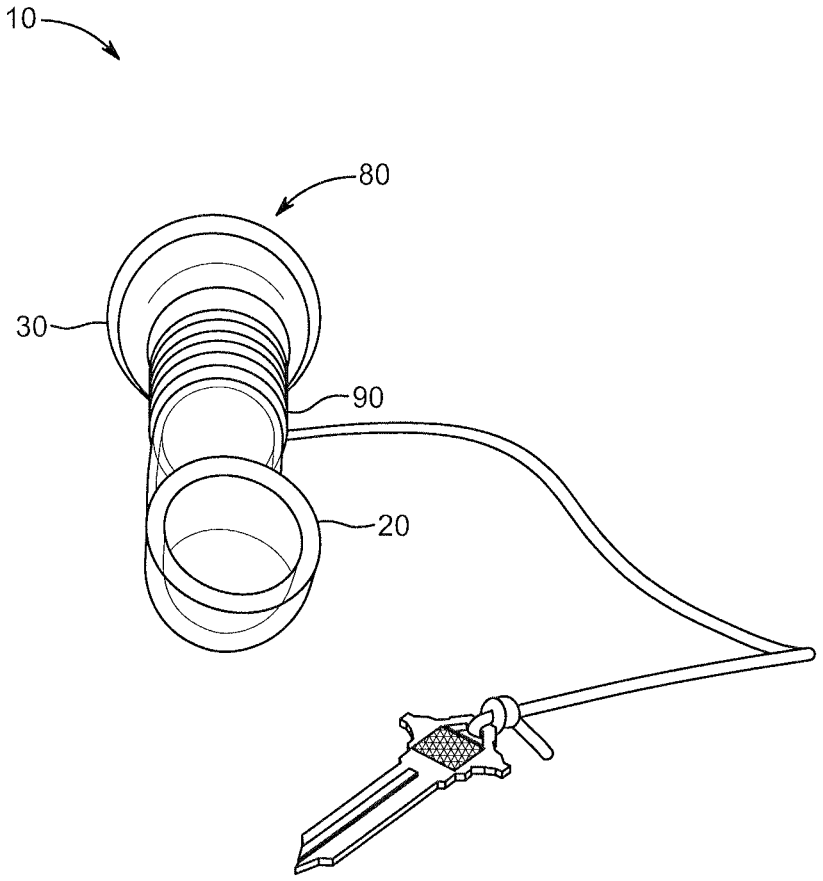
FIG. 2 is a top view of the portable drinking device of the present invention.

FIG. 2 is a top view of the portable drinking device 10, showing that tube 20 preferably has a diameter that is uniform throughout. In the preferred embodiment, tube 20 has a diameter of approximately 1 to 2 inches and a length ranging from approximately 6 to 14 inches. Tube 20 may be fabricated from a variety of materials having a degree of flexibility, such as polypropylene, polyurethane, polyvinyl chloride (PVC), silicone, nylon or other like materials.

As shown in FIGS. 1 and 2, the distal end of tube 20 is fixedly attached to a rounded funnel-like cap 30. The inner diameter of the cap 30 in the area in which it is attached to tube 20 is slightly larger than the outer diameter of tube 20 so that tube 20 fits within that area of cap 30 and can be affixed to cap 30 by several known methods, including the use of adhesives or plastic welding. One method of affixing tube 20 to cap 30 is to place the distal end of tube 20 inside the smaller mouth of funnel cap 30 and then wrap adhesive tape, such as electrical tape or like materials, around the outer junction of tube 20 and cap 30 and then apply a coating of super glue around the tape to ensure that no leaks occur.

Figure 3:
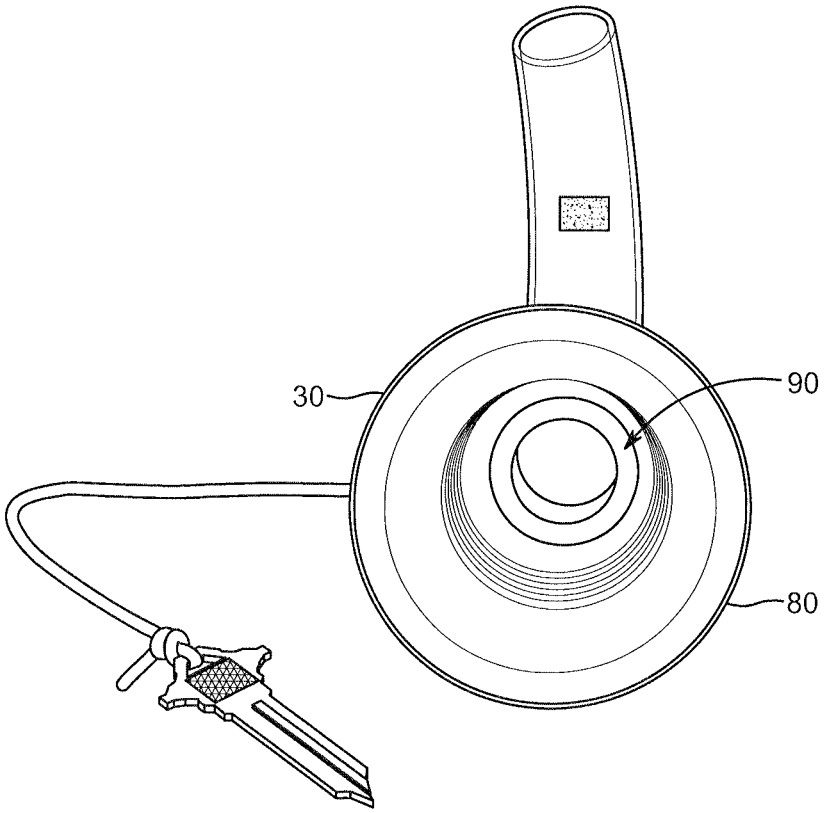
FIG. 3 is a bottom view of the portable drinking device if the present invention.

As shown in FIGS. 1 and 2, cap 30 is a rounded funnel-like structure in which the diameter of the cap at its distal end 80 is greater than the diameter of proximal end 90 which is attached to the tube 20. A bottom view of cap 30 is shown in FIG. 3, illustrating that the distal end 80 of cap 30 has a diameter greater than the diameter of proximal end 90. The diameter of the distal end 80 is approximately 2.5 to 3.5 inches and is intended to fit over the top of a pressurized beverage can. The cap 30 can be made from a variety of durable plastic materials preferably having a hardness or stiffness the same as or greater than that of the material used for tube 20. Cap 30 or its distal end may also be made of a flexible plastic material so that a lip is formed which will create a temporary seal around the lip of a pressurized can when the portable drinking device and can are assembled. Cap 30 may be fabricated from polyvinyl chloride (PVC) or like materials.

FIG. 4 illustrates the portable drinking device 10 of the present invention prior to assembly with a pressurized can. The piercing element 50 may be attached to a string or rope-like element 40 and rope-like element 40 may be attached to tube 20 by, for example, wrapping rope-like element 40 around tube 20 where it meets cap 30. The piecing element 50 may be removably attached to tube 20, as set forth above, by means of a complimentary hook and fastener material like VELCRO® on the respective elements.

Figure 5:
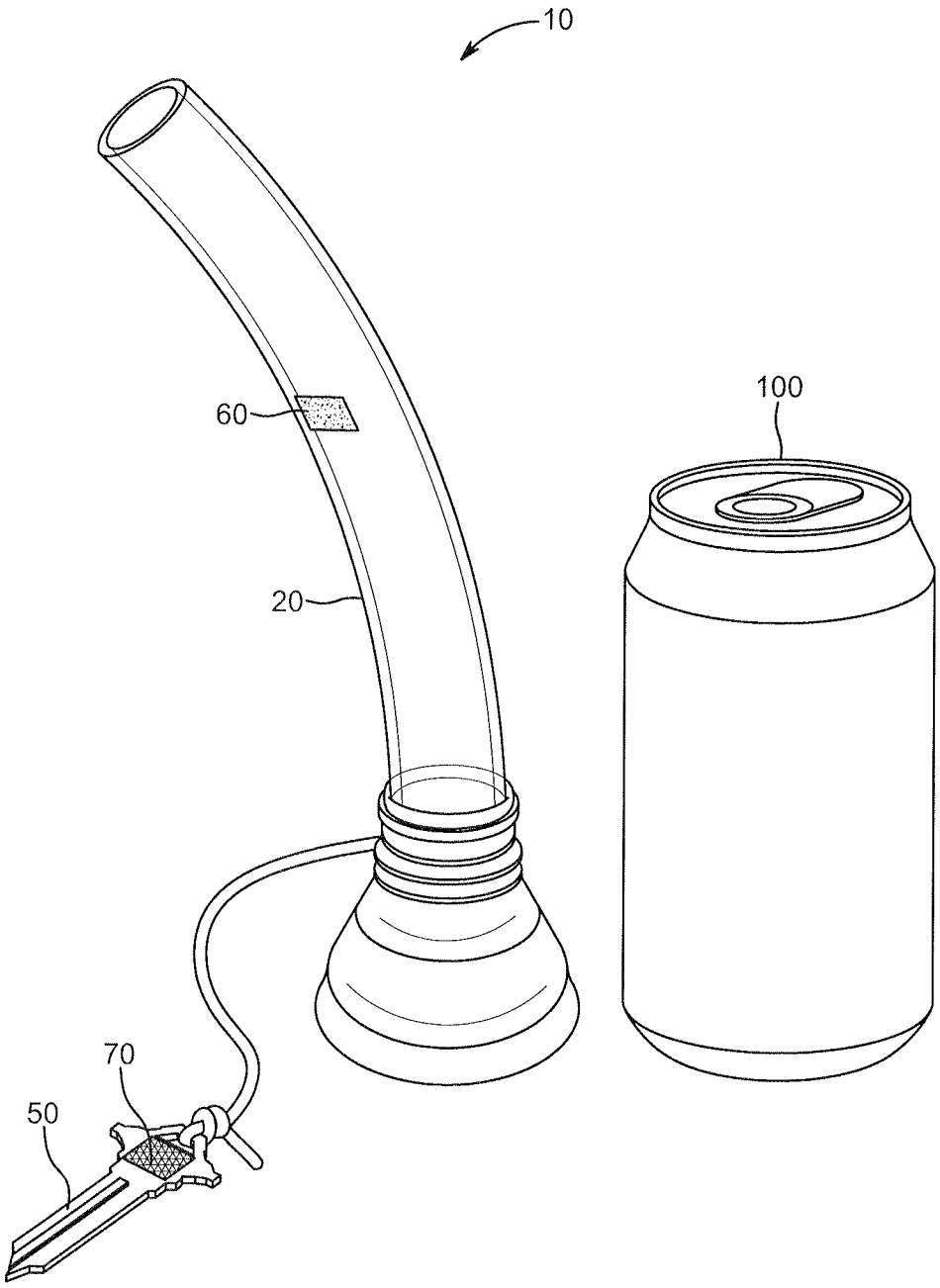
FIG. 5 is a side view of the portable drinking device of the present invention with the piercing element detached from the tube positioned next to a pressurized beverage can.

FIG. 5 shows the portable drinking device 10, with the piercing element 50 detached from tube 20 and the pressurized beverage can 100, before assembly. As set forth above, the cap 30 has the dimensions necessary to allow it to sit on top of the pressurized can 100 and completely cover the top of the can. Cap 30 may also have a lip formed on its distal end 90 that mates with the lip on the top of the pressurized can 100. Cap 30 may be held in place on top of can 100 either by the user's hands or by a lip formed on cap 30 to mate with the lip of a pressurized can.

Figure 6:
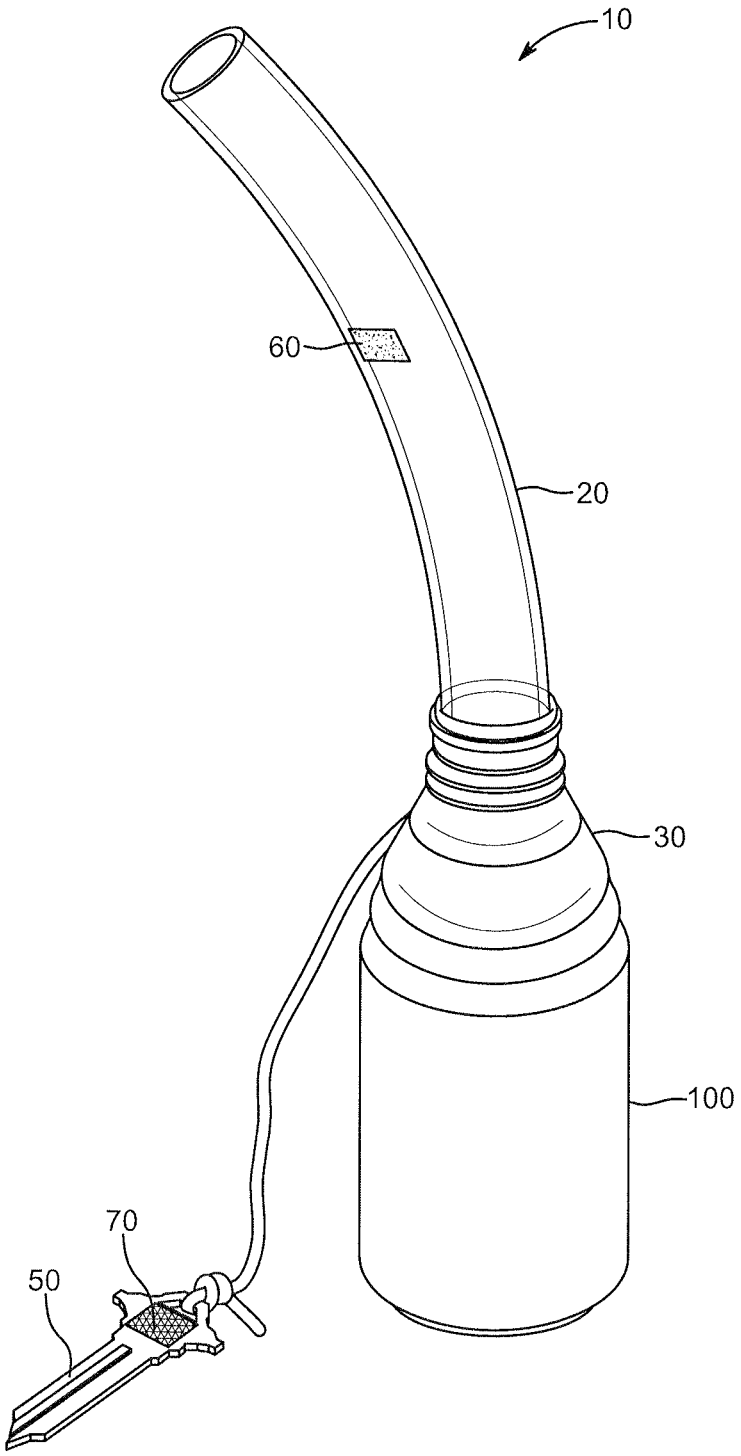
FIG. 6 is a side view of the portable drinking device and pressurized can of FIG. 5 assembled with the portable drinking device mounted on the pressurized can.

FIG. 6 shows the portable drinking device 10 assembled with a pressurized beverage can 100 in the upright position with the piercing element 50 detached from the tube 20. Prior to assembly (and not shown in FIG. 6), the top of can 100, directly below portable drinking device 10, should be been opened by either pulling the tab or using a device, such as a can opener, to open the can. Once pressurized can 100 has been opened, the portable drinking device 10 may be placed over the top of can 100 for use.

Figure 7:
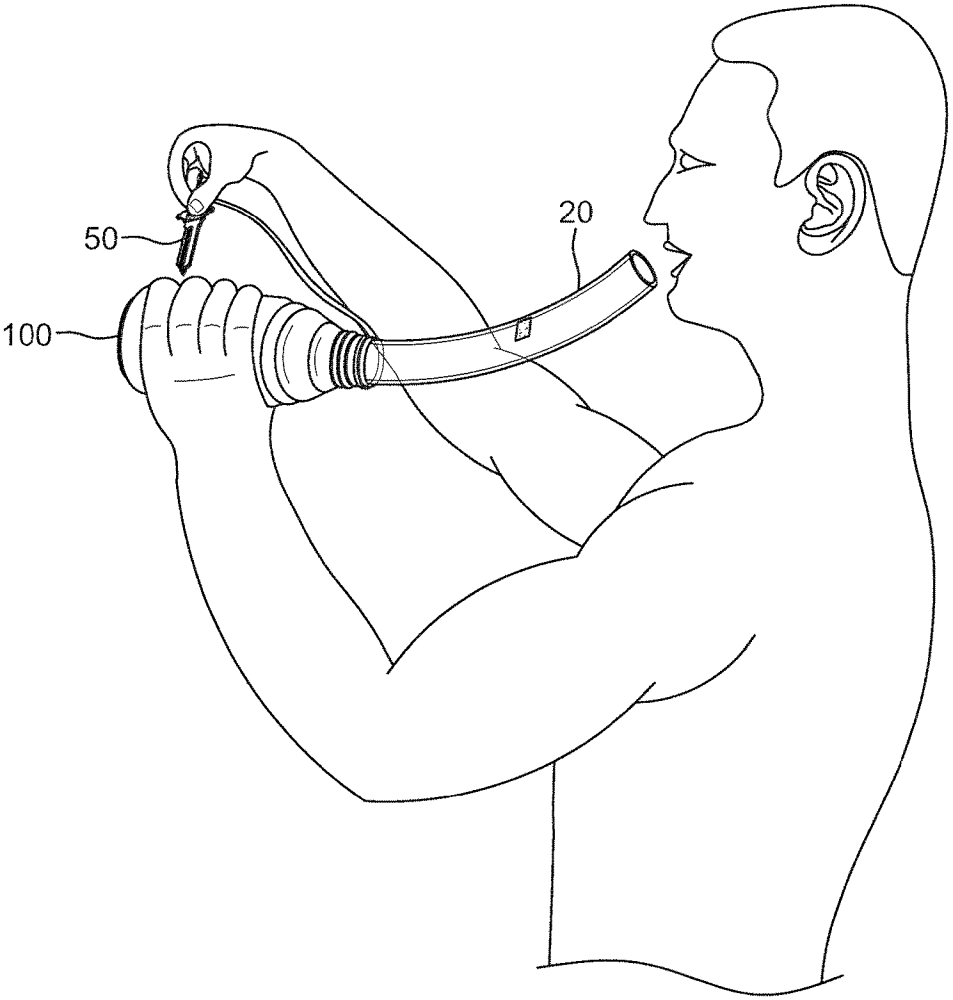
FIG. 7 is a side view of the portable drinking device of the present invention mounted on a pressurized can with the entire assembly being slightly tilted with the piercing element of the portable drinking device positioned to puncture a sidewall of the can.
Figure 8:
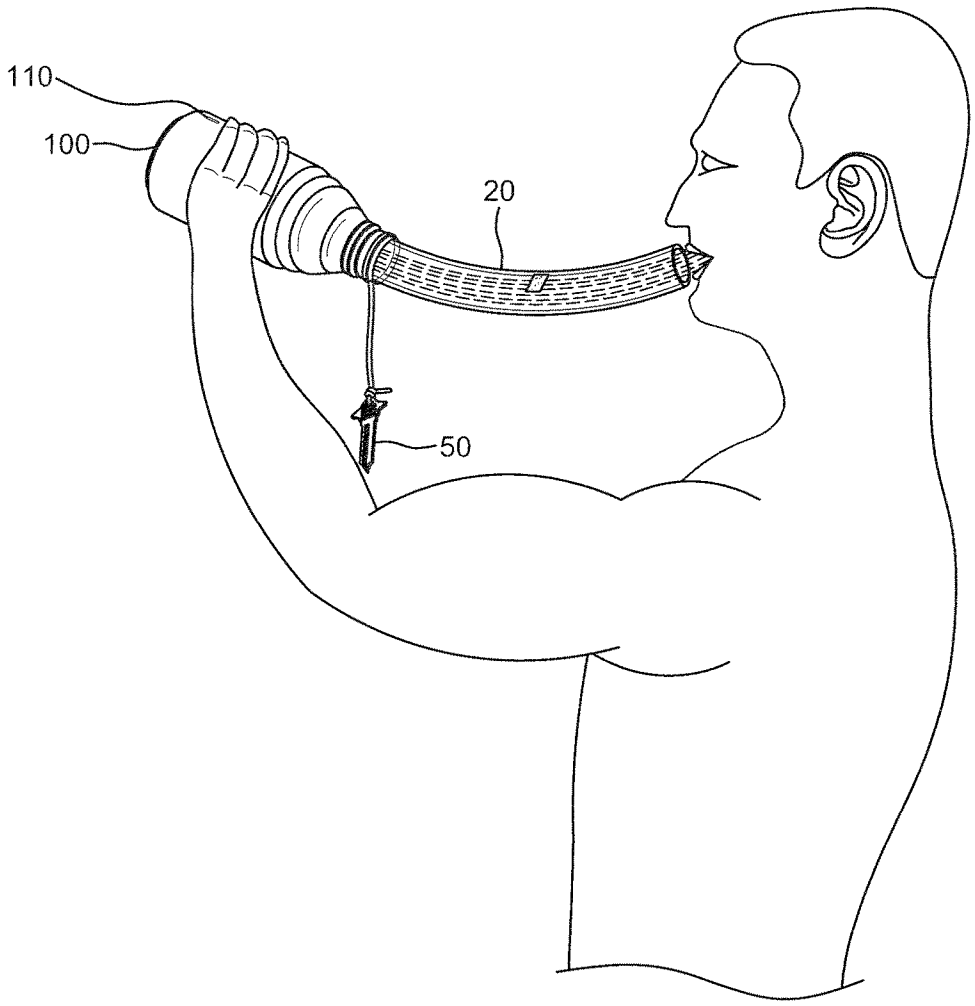
FIG. 8 is a side view of the portable drinking device of FIG. 6 in which the side wall of the can has been punctured and the entire assembly has been being further tilted to position the tube of the portable drinking device to direct the flow of fluid from the can through the portable drinking device into a recipient's mouth.

FIGS. 7 and 8 illustrate how the assembly of FIG. 6 may be used. The entire assembly may be tilted slightly towards the user, with the tube 20 either close to or in the mouth of the user, and the bottom of can 100 located away from the user. While the assembly is in the slightly titled position, the piercing element 50 may be used to pierce or punch a hole (labeled as 110 in FIG. 8) into the lower section of the top face of can 100 (in the tilted position) to release pressure from the can 100. Immediately after the hole 110 is formed in the side of can 100, the entire assembly may be further tilted, as shown in FIG. 8, so that the beverage contained in the can rapidly flows from can 100 through tube 20 into the mouth of the user.

Since the beverage contained in the pressurized can is usually carbonated, as a result of the rapid flow from the pressurized can through the portable drinking device, minimal aeration and foam by-product from the carbonated beverage occurs.

Preferred embodiments of this invention are described herein including the best mode known to the inventors for carrying out the invention. Variations of or modifications to the preferred embodiments may become apparent to those of ordinary skill in the art upon reading the foregoing descriptions. It is intended that the following claims be interpreted to embrace all such variations and modifications.

What is claimed is:

1. A portable drinking device for use with a pressurized beverage can comprising:

an elongated flexible tube having first and second open ends of about the same diameter;

a rounded funnel-like cap having first and second open ends with the first end being smaller in diameter than the second end;

the first end of the cap being configured to receive the second end of the tube so that the cap and tube can be affixed together;

the second end of the cap being configured to receive a pressurized beverage can;

a piercing element operatively attached to the cap and tube structure when the tube and cap are affixed together;

wherein after the pressurized beverage can is opened, the tube, cap and piercing element can be placed upon the open end of the can with the entire assembly first slightly tilted to allow the piercing element to puncture the side of the can and then positioned close to a user's mouth so that after further tilting, the beverage from the can flows through the cap and tube into the user's mouth.

2. The portable drinking device of claim 1 wherein the piercing element may be removably attached to the tube by means of a rope-like element having two ends, one end attached around the tube and cap structure and the second end being attached to a piercing element.

3. The portable drinking device of claim 1 wherein the piercing element may be removably attached to the tube with complimentary hook and fastener materials.

4. The portable drinking device of claim 1 wherein the piercing element may be a key, bottle opener, pen or knife.

5. The portable drinking device of claim 1 where the tube may be made from polypropylene, polyurethane, polyvinyl chloride (PVC), silicone or nylon.

6. The portable drinking device of claim 1 wherein the tube and cap are affixed together using adhesives.

7. The portable drinking device of claim 1 wherein the tube and cap are affixed together using plastic welding.

8. The portable drinking device of claim 1 wherein the second end of the cap has a lip that forms a temporary seal when assembled with the open pressurized beverage can.

*9. A drinking device adapted to facilitate consumption of a beverage contained in a pressurized beverage can that extends from a top end to a bottom end, said drinking device comprising:*

*a cap extending from a first open end to a second open end;*

*a tube extending from a first opening to a second opening, the second opening of the tube extend from the first open end of the cap; and*

*a piercing element;*

*wherein the second open end of the cap being configured to reversibly and retentively attach to the top end of the beverage can, and wherein the second open end of the cap includes a lip that is configured to forms a temporary seal around the beverage can when attached to the top end of the beverage can.*

*10. The drinking device of claim 9 wherein the tube and the cap form a unitary assembly.*

*11. The drinking device of claim 10 wherein the tube and the cap are attached to each other with adhesive.*

*12. The drinking device of claim 9 wherein the piercing element is attached to the tube or the cap.*

*13. The drinking device of claim 12 wherein the piercing element is removably attached to the tube or the cap.*

*14. The drinking device of claim 9 wherein the first opening of the tube is smaller in diameter than the second open end of the cap.*

*15. The drinking device of claim 9 wherein the tube and the cap are formed of different methods.*

*16. The drinking device of claim 9 wherein the tube and the cap are each fabricated from flexible materials selected from a group consisting of polypropylene, polyurethane, polyvinyl chloride, silicone and nylon.*

*17. The drinking device of claim 9 wherein the tube is fabricated from a flexible material.*

*18. A method of using a drinking device adapted to facilitate consumption of a beverage contained in a pressurized beverage can extending from a top end to a bottom end, said method comprising:*

*providing a cap extending from a first open end to a second open end, the first open end is smaller in diameter than the second open end;*

*providing a tube extending from a first opening to a second opening, the second opening is extended from the first open end of the cap;*

*opening the pressurized beverage can;*

*reversibly and retentively attaching the second open end of the cap to the top end of the beverage can; and*

*using a piercing element to puncture the pressurized beverage can.*

*19. The method of claim 18 wherein the second open end of the cap includes a lip that is configured to forms a temporary seal around the beverage can when attached to the top end of the beverage can.*

* * * * *